A. P. Winslow, 2. Sheets, Sheet. 1.

Cut Nail Machine.

No. 4214. Reissued Dec. 20. 1870.

Witnesses:

H. J. Arents

Thos. D. D. Curand

Inventor:

A. P. Winslow

Per Munn & Co

Attorneys.

A. P. Winslow. 2. Sheets, Sheet. 2.

Cut Nail Machine.

No. 4,214. Reissued Dec. 20. 1870.

Witnesses:

H. J. Streets

Thos. D. D. Durand

Inventor:

A. P. Winslow

Per [illegible]

Attorneys.

United States Patent Office.

ALONZO P. WINSLOW, OF CLEVELAND, OHIO.

Letters Patent No. 108,225, dated October 11, 1870; reissue No. 4,214, dated December 20, 1870.

IMPROVEMENT IN MACHINES FOR CUTTING NAILS.

The Schedule referred to in these Letters Patent and making part of the same.

*To all whom it may concern:*

Be it known that I, ALONZO P. WINSLOW, of Cleveland, in the county of Cuyahoga and State of Ohio, have invented certain new and useful Improvements in Nail-Machines, of which the following is a description.

PLATE I.

Figure 1:
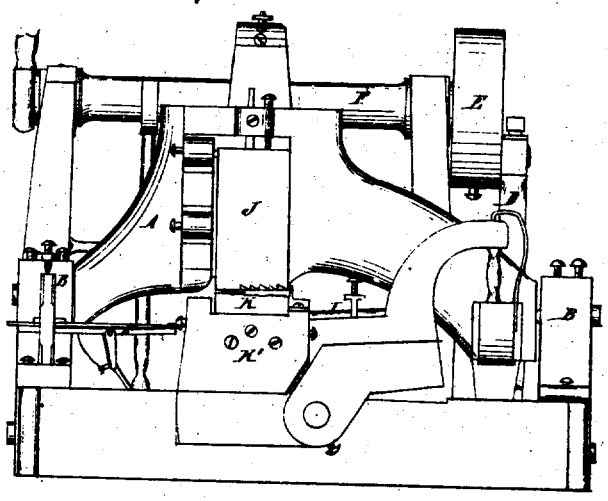
Figure 2:
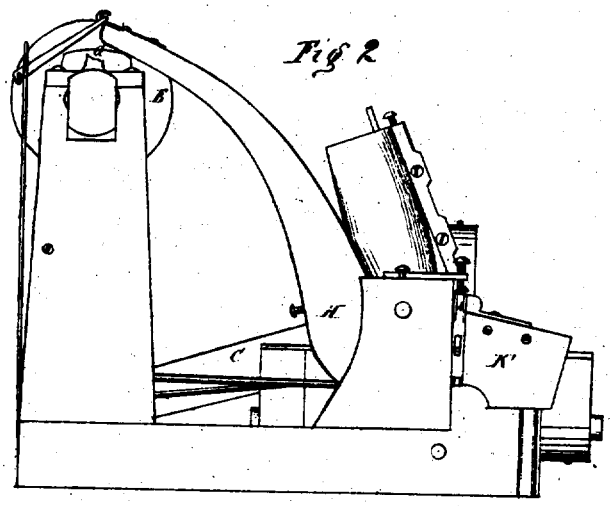

Figure 1 is a front view of the machine.
Figure 2 is a side view of the same.

PLATE II.

Figure 3:
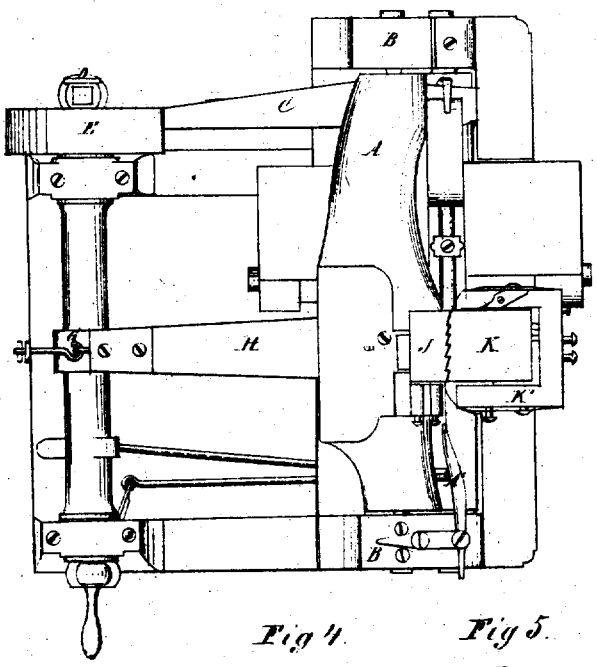
Figure 4:
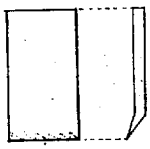
Figure 5:
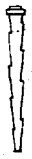

Figure 3, a view of the top.
Figure 4, a detached section.
Figure 5, a view of a nail.

Like letters of reference refer to like parts in the different views.

This invention has for its object the cutting of nails, so that the shank thereof shall be shouldered or barbed, whereby said nails are prevented from being withdrawn from the timber after being driven therein, as hereinafter more fully described.

In fig. 1—

A represents the oscillating cutting-beam of a nail-machine, pivoted in the standards B, and operated by the lever or arm C, fig. 3, said arm being connected by a pitman, D, to a crank, E, secured to the outer end of the shaft F.

On said shaft is a cam, G, ng. 2, whereby is operated the griping-lever H, for holding the nail while it is being headed by the header I, operated by the lever C, all of which is, or may be, constructed and operated in the same manner as this class of machines in ordinary use.

J, fig. 1, is the movable blade or knife, secured in the oscillating beam, a detached view of which is shown in fig. 4, in which it will be seen that the cutting-edge thereof is serrated for about two-thirds of its width. Said serrations do not extend through the thickness of the cutting-edge, but are notched into the face of the edge, whereas the basil of the edge remains straight, the purpose of which will presently be shown.

K, fig. 3, is the bed or stationary cutter, secured in the bed K'. The edge of said cutter is also serrated in like manner as that of the vibratory cutters J, with the exception that the serrations extend through the blade, and with which it is arranged in such relation that the serrations of the one fit into those of the other when the two edges are brought in proximity to each other, for the purpose of cutting, as shown in fig. 3.

The practical operation of this machine is as follows:

A plate of metal of the proper width for the length of a nail is fed to the machine in the ordinary way. Each nail, as it is cut, is seized by the nippers and held by the grip for the operation of the header.

The nipper referred to and shown at A', figs. 1 and 3, is the same as those in use in the ordinary nail-machines.

It will be obvious that the shank of the nails cut by the above-described cutters will have a serrated or barbed shank, as shown in fig. 5, in which it will be seen that the shoulders or barbs of the serrations are facing the head of the spike, which, on being driven into the timber, will effectually prevent it from being withdrawn, as the shoulders prevent a resistance to the wood embraced by the serrations; hence, work put together by such nails is much stronger and more durable than when secured together by the ordinary nail, and which may be made at a cost but little above the ordinary one.

It will be observed that the operation of this machine is essentially the same as those in use for cutting the ordinary straight nail; hence, no substantial change will be required to adapt it to cutting the barbed spike, the form of the edge of the cutters being all that is changed; hence, the ordinary nail-machine for cutting straight nails can be easily converted to one for cutting the above-described barbed spikes.

Nails of this construction will, in many cases, take the place of screws, and not cost as much.

It will be observed that the barbs of the nail are alternating in their relation to each other, so that its strength is not lessened by being thus made. This alternation of the barbs is made by turning the plate in the act of feeding it to the machine.

*Claim.*

I claim as my improvement in nail-cutting machines—

The serrated-edged cutters J K, when arranged in relation to each other, to operate in the manner substantially as described, and for the purpose set forth.

To the above specification of my invention I have signed my hand this 18th day of November, A. D. 1870.

ALONZO P. WINSLOW.

Witnesses:
JOHN N. MILLARD,
GEO. W. WOODWORTH.